Figure 1:
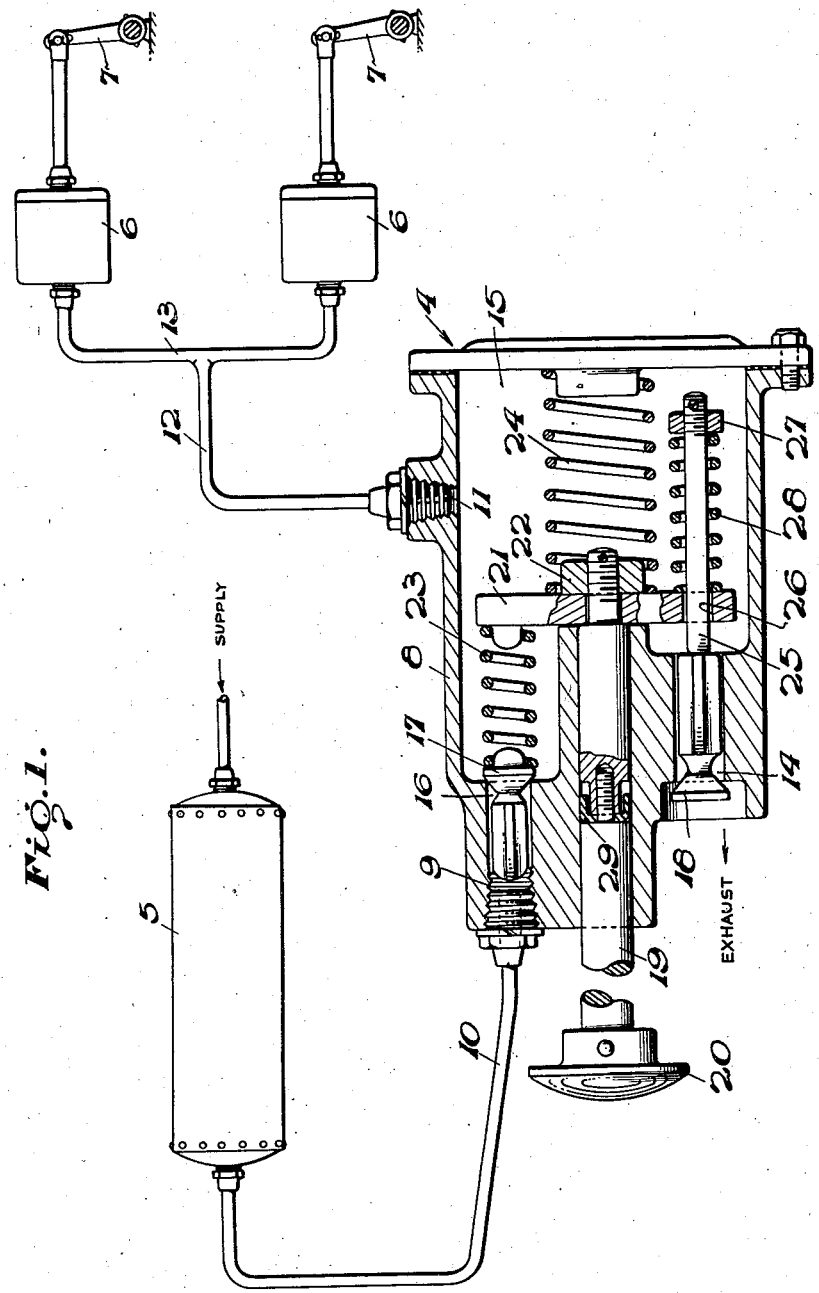

Sept. 28, 1948.  W. A. EATON  2,450,275
CONTROL VALVE MECHANISM
Filed May 18, 1945  2 Sheets-Sheet 1

Inventor
Wilfred A. Eaton.
By Scrivener + Parker
Attorneys

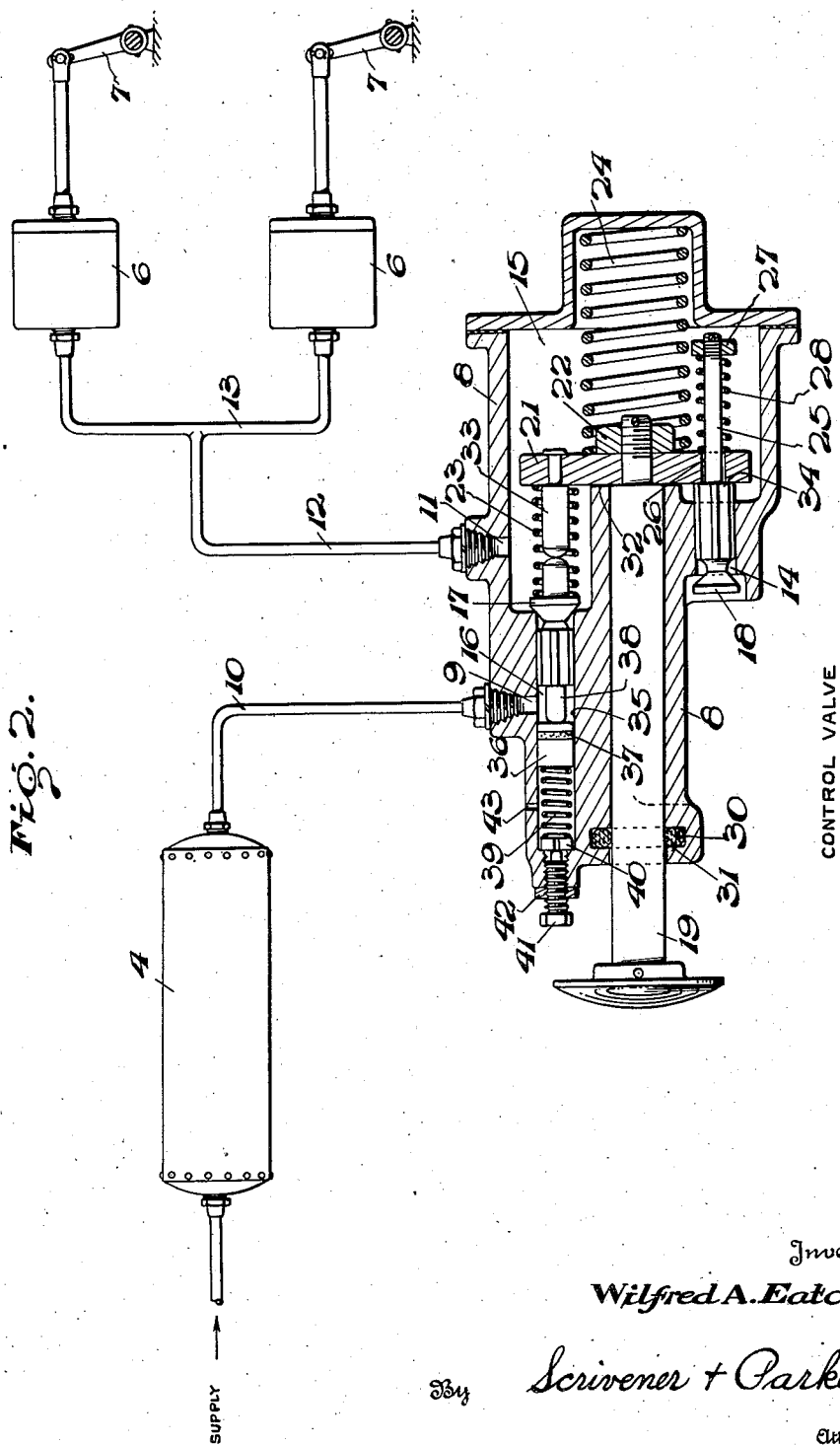

Patented Sept. 28, 1948

2,450,275

UNITED STATES PATENT OFFICE 2,450,275

CONTROL VALVE MECHANISM

Wilfred A. Eaton, Elyria, Ohio, assignor to Bendix-Westinghouse Automotive Air Brake Company, Elyria, Ohio, a corporation of Delaware Application May 18, 1945, Serial No. 594,514

16 Claims. (Cl. 303—54)

1

This invention relates to control valve mechanism, and more particularly to self-lapping fluid pressure control valve mechanism of the type adapted to control the supply of fluid pressure to the actuators in a fluid pressure brake system.

Various valve mechanisms have previously been proposed for controlling the operation of the brake actuators on a vehicle, and most of these have been of the so-called self-lapping type, wherein the valves are operated through a resilient connection, and wherein the valves are moved to lapped position by means of a pressure responsive member subjected to the pressure supplied to the actuators and adapted to oppose the operation of the resilient means. Difficulty has been experienced in some cases with control valves of the above type due to failure of the pressure responsive member, and due to the difficulty of installing the valve mechanism on the vehicle because of the relatively large size of the pressure responsive member required, and it is accordingly an object of the present invention to provide self-lapping fluid pressure control valve mechanism of simple and efficient construction so constituted as to include a minimum number of parts subject to failure, and of such size as to permit ready installation in a relatively small space on the vehicle.

Another object of the invention is to provide self-lapping valve mechanism so constituted as to eliminate the necessity for the use of a pressure responsive member to effect lapping of the valves.

Yet another object of the invention is to provide, in a valve mechanism of the above type, means for apprising the operator of the degree of pressure being supplied by the valve mechanism to the fluid pressure actuators.

Still another object of the invention is to provide, in a valve mechanism of the above type, inlet and exhaust valves adapted to be urged toward open position by the pressure in the fluid pressure supply system and the pressure delivered by the valve respectively, together with resilient means for urging the valves toward closed position with forces varying in accordance with the degree of movement of the operator's control element.

Another object of the invention is to provide, in connection with valve mechanism of the above type, means for assuring uniform control of the valves therein regardless of variations in the supply pressure to the valve mechanism.

A still further object of the invention is to provide means for positively positioning the

2 valves therein when the valve mechanism is ineffective to supply fluid pressure to the actuators.

Yet another object of the invention is to provide means for adjusting various portions of the mechanism to insure satisfactory operation.

These and other novel features and objects of the invention will appear more fully hereinafter from the following detailed description, when taken in connection with the accompanying drawings. It is to be expressly understood, however, that the drawings are employed for purposes of illustration only, and are not designed as a definition of the limits of the invention, reference being had for this purpose to the appended claims.

In the drawings, wherein similar reference characters refer to similar parts throughout the several views:

Fig. 1 is a diagrammatic view, partially in section, showing one form of the invention, and Fig. 2 is a diagrammatic view, partially in section, showing another form of the invention.

Referring more particularly to Fig. 1 of the drawings, a self-lapping fluid pressure control valve mechanism 4 is illustrated in connection with an elementary fluid pressure brake system including in general, a reservoir 5, a pair of fluid brake actuators 6, and brake arms 7 adapted to be actuated thereby. The brake valve mechanism 4 is provided with a casing 8 having an inlet port 9 connected to the reservoir by a conduit 10, an outlet port 11 connected with the actuators by means of conduits 12 and 13, and an exhaust port 14, and it will be understood, as will be more fully explained hereinafter, that with the parts in the position shown, the actuators are in communication with atmosphere through the valve mechanism and the exhaust port therein, while communication between the conduits 10 and 12 is prevented.

Referring more particularly to the construction of the valve mechanism 4, the casing is provided with an outlet chamber 15 which is connected to the outlet port 11 as well as to the exhaust port 14. An inlet chamber 16 forms a continuation of the inlet port 9, and is adapted to be connected with the outlet chamber. An inlet valve 17 is slidably mounted in the inlet chamber, and is adapted to be moved toward closed position against the pressure in the inlet chamber. In like manner an exhaust valve 18 is slidably mounted in the exhaust port and is adapted to be moved toward closed position against the pressure in the outlet chamber. A valve operating element 19 is slidably mounted in the casing as shown, being provided at its left end with an operator's control button 20, and at its right end with a suitable beam 21 positioned thereon by means of a nut 22. An inlet valve spring 23 is interposed between the beam and the right end of the inlet valve, and with the parts in the position shown, the spring is so tensioned as to maintain the inlet valve in closed position with a force equal to or slightly greater than the opposing force exerted on the valve by the pressure in the inlet chamber, and in order to insure maintenance of the beam and the valve operating element in release position as shown, a spring 24 is interposed between the casing and the right side of the beam, this latter spring having a tension equal to or greater than the tension of the spring 23 in order to insure positive maintenance of the element or beam in released position except when moved therefrom by the action of the operator. The exhaust valve 18 is provided with a stem 25 extending to the right through a bore 26 formed in the lower end of the beam, and is provided at its right end with an adjusting nut 27 threadedly received thereon. Operation of the exhaust valve by movement of the beam 21 is controlled by means of an exhaust valve spring 28 interposed between the nut 27 and the right side of the beam, and this spring may be so adjusted as to either maintain the valve in closed position with the valve operating element in the position shown, or to permit the valve to remain in a slightly open position as shown in the drawing. In the latter case, the tension of the spring 23 is preferably so adjusted that the force exerted thereby does not decrease sufficiently to permit opening of the inlet valve by the action of the pressure in the inlet chamber until the spring 28 has been tensioned sufficiently to maintain the exhaust valve in closed position with a force sufficient to prevent leakage from the outlet chamber through the exhaust port. Leakage of fluid pressure from the outlet chamber by the valve operating element 19 is prevented by means of a suitable sealing device 29. Bearing in mind that the element 19 has a sliding fit in the casing, it will be appreciated that the clearance required for such a fit will enable the fluid pressure within the chamber 15 to act upon the device 29 to oppose operation of the valve operating element 19 by the operator. It will also be understood that the area of this device can be of any desired value in order to oppose the operation of the valve operating element by the operator to the right with a force proportional to the pressure existing in the outlet chamber, thus providing the operator with a definite and reliable indication of the degree of fluid pressure being supplied to the brake actuators. It will also be apparent that in the event it is desired to reduce the force necessary to operate the element 19, the area of the pressure responsive device 29 can be made extremely small, in which case the major portion of the force which must be overcome by the operator is that provided by the spring 24 and by the exhaust valve spring 28.

It will be apparent from the foregoing that the pressure responsive action of the valve operating element plays no direct part in controlling the lapping action of the inlet and exhaust valves, this action being controlled entirely by the operation of the springs 23 and 28 as their forces are varied in response to movement of the valve operating element. With the parts arranged as shown in Fig. 1, and with the exhaust valve permitted to remain in open position, it will be understood that the spring 23 is compressed by the action of the spring 24 sufficiently to maintain the inlet valve 17 in closed position against the pressure in the inlet chamber 16, and at the same time to exert an additional force on the inlet valve sufficiently to insure against leakage by the valve from the inlet chamber to the outlet chamber. On movement of the valve operating element and the beam to the right, the tension on the spring 23 decreases, and the tension on the spring 28 increases to close the exhaust valve. Assuming that the inlet and exhaust valves have equal areas, for example, the inlet and exhaust valve springs are so chosen that when the force exerted by the spring 23 is decreased to a point where it exactly balances, the force exerted on the valve to the right by the fluid pressure in the inlet chamber, the spring 28 exerts sufficient force on the exhaust valve to move the latter to closed position, and to preferably maintain the valve in closed position against a slight pressure in the outlet chamber which may be of the order of one pound, or any other desired value depending on the degree of sensitivity desired in the control valve mechanism. Any further movement of the element and beam to the right will further decrease the force exerted by the spring 23 and correspondingly increase the force exerted by the spring 28, thus permitting the pressure in the chamber 16 to open the valve 17 and admit fluid pressure from the inlet chamber to the outlet chamber, and thence to the brake actuators through the outlet port 11 and conduits 12 and 13. With the beam remaining in the above described position, the pressure in the outlet chamber will increase, and due to the differential of pressures across the inlet valve, a point will be reached where the force exerted by the pressure in the chamber 16 will be insufficient to maintain the inlet valve in open position, whereupon the valve will be moved to closed position by the action of the inlet valve spring 23. At the same time, the force exerted by the exhaust valve spring 28, assuming that the latter is properly proportioned with respect to the inlet spring 23, will have been increased sufficiently to maintain the exhaust valve in closed position against the pressure set up in the outlet chamber by the above described operation of the inlet valve, and this condition will obtain throughout the range of operation of the valve operating element. Assuming that a predetermined pressure has been established in the outlet chamber in the above manner, it will be clear that on release movement of the valve operating element, the tension on the inlet valve spring will be increased, and the tension on the exhaust valve spring will be decreased in order to allow the pressure in the outlet chamber to open the exhaust valve to effect a pressure reduction in the outlet chamber substantially corresponding to the degree of reverse movement of the valve operating element. Although the inlet and exhaust valves are shown in the drawing as having substantially equal areas, it will be understood that in the event valves of unequal areas are found desirable, the dimensions of the corresponding springs can be changed to compensate for the differences in areas, in such a manner that the type of operation above described will be obtained. It is also pointed out that with a predetermined pressure established in the outlet chamber, and with the valves in lapped position, any leakage by the inlet valve will increase the pressure in the outlet chamber and open the exhaust valve momentarily in order to release the excess pressure. In like manner, leakage by the exhaust valve will be compensated for automatically by momentary opening of the inlet valve in response to a slight pressure reduction in the outlet chamber. It will also be noted that the degree of compression of the spring 28, for any given position of the valve operating element, can be readily adjusted by means of the nut 27, and in this manner, assuming that the valves are in lapped position and that a selected pressure has been established in the outlet chamber 15, the degree of reverse movement of the valve operating element necessary to permit opening of the exhaust valve to reduce the pressure in the outlet chamber can be readily established.

Referring now to Fig. 2 of the drawings, the control valve mechanism is provided with a casing 8 having inlet and outlet ports 9 and 11, an exhaust port 14, an outlet chamber 15, an inlet chamber 16, inlet and exhaust valves 17 and 18, and a valve operating element 19. A beam 21 is attached to the right end of the element by means of the nut 22, and the element is normally maintained in release position by the spring 24. Inlet and exhaust valve springs 23 and 28 are interposed respectively between the inlet valve and the beam and between the beam and an adjusting nut 27 carried on the stem 25 of the exhaust valve. The inlet port is supplied with fluid pressure from the reservoir 4 through a conduit 10, and the outlet chamber and the port 11 are connected with the actuators 6 by means of conduits 12 and 13. As in the case of Fig. 1, the valve operating element is shown as being responsive to the pressure in the outlet chamber 15, but in this instance, leakage of pressure from the outlet chamber by the element is prevented by means of a sealing element 30, carried in a groove 31 formed in the casing.

In the construction shown in Fig. 2, means are provided which are effective, when the valve operating element is in released position, for maintaining the inlet valve in closed position with a predetermined force and for positively maintaining the exhaust valve in open position. It will be noted that movement of the valve operating element and the beam 21 to the left is limited by a shoulder 32 formed in the casing, and that, as heretofore stated, the tension of the spring 24 may be greater than that of the inlet valve spring 23 with the parts in the position shown. The excess force exerted by the spring 24 is therefore imparted directly to the inlet valve by means of a stem 33, attached to the upper end of the beam as shown, and adapted to abut the right end of the inlet valve. This excess force can be made as large as desired within reasonable limits by properly designing the spring 24, and the excess force thus exerted on the inlet valve may be made sufficient to prevent leakage by this valve when the valve operating element is in released position. In order to insure proper operation of a valve of this type, and assuming again for the purposes of this description that the inlet and exhaust valves have the same area, it is necessary that on movement of the valve operating element to the right, the decrease in force exerted by the spring 23 be substantially equal to the increase in force exerted by the spring 28, and it is also desirable that the exhaust valve be definitely maintained in open position in order to prevent any increase in pressure in the outlet chamber 15 due to possible leakage of the inlet valve. In order to obtain the desired force relationships between the inlet and outlet valve springs during the range of operation of the element 19, and at the same time to insure maintenance of the exhaust valve in open position when the valve operating element is in released position, the construction is such that the exhaust valve spring may be slightly preloaded between the nut 27 and the right side of the beam 21, this preloading being accomplished by providing a shoulder 34 on the exhaust valve adapted to engage the left surface of the beam. Thus, even though the spring 28 is slightly compressed during installation, the exhaust valve is prevented from being moved to closed position by the action of the spring when the parts are in the position shown. As the valve operating element is moved to the right to permit opening of the inlet valve, the exhaust valve is moved against its seat, and on further movement, the exhaust valve spring is compressed in order to maintain the exhaust valve in closed position with a force slightly greater than that exerted in the opposite direction by the pressure admitted to the outlet chamber by the operation of the inlet valve.

Since the inlet valve is urged toward open position by the pressure in the inlet chamber, it will be understood that in the event the force exerted by the inlet valve spring in the position shown is adjusted for a predetermined supply pressure in the inlet chamber, a variation in this pressure would affect the uniformity of operation of the valve mechanism. Thus a decrease in the inlet chamber pressure, for example, would require additional movement of the valve operating element 19 to the right in order to sufficiently reduce the force exerted by the inlet valve spring 23 to permit the pressure in the inlet chamber to move the valve toward open position, and it is conceivable that in the event of an excessive drop in pressure in the inlet chamber, it would be necessary for the operator to move the valve operating element through a considerable distance before fluid pressure could be supplied by the control valve mechanism to the actuators. In order to compensate for these variations in pressure in the inlet chamber in such a manner that the pressure set up in the outlet chamber is substantially proportional to the degree of movement of the valve operating element from released position, regardless of the change in pressure in the inlet chamber, the inlet chamber 16 is formed with a bore 35 having substantially the same area as the inlet valve, and a piston 36, provided with a sealing member 37, is slidably mounted in the bore and is adapted on movement to the right to abut the left end of a stem 38 formed on the inlet valve. In addition, an auxiliary spring 39 is mounted in the bore at the left of the piston or pressure responsive member and is interposed between the left end of the piston and a spring seat 40 mounted in the left end of the bore and adapted to be positioned adjustably by means of an adjusting screw 41 threadedly received in the casing and locked in position by means of a suitable locknut 42.

Assuming that the above valve mechanism is designed to work with a certain maximum pressure in the reservoir and in the inlet chamber, the spring 39 is so adjusted and proportioned that when this pressure is present in the inlet chamber, the force exerted on the piston by the pressure in the inlet chamber is just sufficient to balance the force exerted by the spring 39, with the result that no force is exerted by the piston on the stem of the inlet valve tending to move the latter toward open position. In the event the pressure in the supply reservoir and in the inlet chamber is now reduced for some reason, it will be apparent that the force tending to move the inlet valve to open position due to this pressure will decrease. At the same time, however, the force exerted on the piston to the left by the pressure in the chamber will correspondingly decrease, and a portion of the force exerted by the biasing spring 39 will be imparted to the piston and thence to the stem of the inlet valve. By properly proportioning the spring 39, and by properly adjusting the original degree of compression of the spring, the mechanism may be so constituted that the decrease in force acting on the inlet valve due to the drop in the inlet chamber pressure will be fully compensated for by the increased effectiveness of the spring 39 as a result of the decrease in force acting on the piston 36 toward the left. With this arrangement, and assuming, as heretofore stated, that the spring 39 has been proportioned and adjusted in such a manner that the spring exerts no force on the valve at the maximum working pressure of the fluid pressure supply system, it will be clear that at any lower pressure in the inlet chamber, the degree of movement of the valve operating element 19 necessary to permit opening of the inlet valve will be substantially the same regardless of the amount of drop in the inlet chamber pressure. It is also noted that in order to prevent a variation in the action of the piston 36 due to leakage by the piston from the inlet chamber, an atmospheric vent 43 is provided in the casing as shown in order to permit the discharge of such leakage to atmosphere.

There has thus been provided by the present invention, self-lapping control valve mechanism of a simple and efficient type, so constituted as to entirely eliminate the necessity for the use of the relatively large conventional pressure responsive member which is used to control the movement of the inlet and exhaust valves to lapped position in many fluid pressure control valves of the self-lapping type. Means have also been provided to provide a reaction on the operator's control element if desired, this reaction being proportional to the pressure supplied by the control valve mechanism to the actuators. Furthermore, means have been provided to insure consistent and uniform operation of the control valve mechanism to control the degree of pressure supplied to the actuators, regardless of variations of pressure in the fluid pressure supply system, as well as means for insuring positive operation and positioning of the inlet and exhaust valves when the operator's control element is in release position, thus insuring against leakage by the inlet valve and at the same time insuring the complete exhaust of fluid pressure from the valve mechanism.

While the invention has been illustrated and described herein with considerable particularity, it is to be understood that the same is not limited to the forms shown, but may receive a variety of mechanical expressions, as will readily appear to those skilled in the art. Reference will, therefore, be had to the appended claims for a definition of the limits of the invention.

What is claimed is:

1. Self-lapping fluid pressure control valve mechanism including a casing having an inlet chamber, an outlet chamber, an exhaust port in the outlet chamber, an inlet valve for preventing communication between the inlet and outlet chambers and adapted to be moved to open position by the pressure in the inlet chamber, an exhaust valve adapted to close the exhaust port and adapted to be moved to open position by the pressure in the outlet chamber, a valve operating element having a release position and movable to other positions, resilient means for normally maintaining said element in release position, inlet and exhaust valve springs in the outlet chamber adapted to respectively bias the inlet and exhaust valves toward closed position, and a beam having its central portion connected to said element and having oppositely extending arms arranged in a common plane and bearing against said last named springs, whereby on movement of the element from release position the biasing action of the inlet valve spring is decreased in proportion to the degree of movement of the element and the biasing action of the exhaust valve spring is proportionately increased.

2. Self-lapping fluid pressure control valve mechanism including a casing having an inlet chamber, an outlet chamber, and an exhaust port in said outlet chamber, inlet and exhaust valves operable respectively to control the flow of fluid pressures between said inlet and outlet chambers and through said exhaust port, and means for controlling the operation of said valves including a valve operating element, resilient biasing means connected with said element adapted to bias the valves toward closed position and operable on movement of said element in one direction to decrease the biasing action of said resilient means on the inlet valve and to proportionately increase the biasing action of said means on the exhaust valve, other resilient means for biasing said inlet valve toward open position, and means responsive to the pressure in the inlet chamber for opposing the operation of said other biasing means.

3. Self-lapping fluid pressure control valve mechanism including a casing having an inlet chamber, an outlet chamber, and an exhaust port in said outlet chamber, inlet and exhaust valves operable respectively to control the flow of fluid pressure between said inlet and outlet chambers and through said exhaust port, means for mounting said inlet valve so as to be urged toward open position by the pressure in the inlet chamber, and means for controlling the operation of said valves including a valve operating element, resilient biasing means connected with said element adapted to bias said valves toward closed position and adapted on movement of said element in one direction to decrease the biasing action on the inlet valve and to increase the biasing action on the exhaust valve, and means including a member responsive to the pressure in the inlet chamber for resiliently biasing said inlet valve toward open position with a force variable in accordance with variations of pressure in said inlet chamber.

4. Self-lapping fluid pressure control valve mechanism including a casing having an inlet chamber, an outlet chamber, and an exhaust port in said outlet chamber, inlet and exhaust valves operable respectively to control the flow of fluid pressure between said inlet and outlet chambers and through said exhaust port, and means for controlling the operation of said valves including a valve operating element having a release position, resilient means for normally maintaining said element in said release position, resilient means connecting said element and valves adapted to bias said valves toward closed position and adapted on movement of said element from release position to decrease the biasing action on said inlet valve and to increase the biasing action on said exhaust valve, and means for effecting a non-yielding connection between said exhaust valve and element for maintaining the exhaust valve in open position when said element is in release position.

5. Self-lapping fluid pressure control valve mechanism including a casing having an inlet chamber, an outlet chamber, and an exhaust port in said outlet chamber, inlet and exhaust valves operable respectively to control the flow of fluid pressure between said inlet and outlet chambers and through said exhaust port, and means for controlling the operation of said valves including a valve operating element having a release position, resilient means for normally maintaining said element in said release position, resilient means connecting said element and valves adapted to bias said valves toward closed position and adapted on movement of said element from release position to decrease the biasing action on said inlet valve and to increase the biasing action on said exhaust valve, and means for effecting a non-yielding connection between said inlet valve and element for maintaining said inlet valve in closed position when the element is in release position.

6. Self-lapping fluid pressure control valve mechanism including a casing having an inlet chamber, an outlet chamber, and an exhaust port in said outlet chamber, inlet and exhaust valves operable respectively to control the flow of fluid pressure between said inlet and outlet chambers and through said exhaust port, and means for controlling the operation of said valves including a valve operating element having a release position, resilient means for normally maintaining said element in said release position, resilient means connecting said element and valves adapted to bias said valves toward closed position and adapted on movement of said element from release position to decrease the biasing action on said inlet valve and to increase the biasing action on said exhaust valve, and means for effecting non-yielding connections between said valves and element for maintaining the exhaust valve in open position and the inlet valve in closed position when said element is in release position.

7. Self-lapping fluid pressure control valve mechanism including a casing having an inlet chamber, an outlet chamber, and an exhaust port in said outlet chamber, inlet and exhaust valves operable respectively to control the flow of fluid pressure between said inlet and outlet chambers and through said exhaust port, and means for controlling the operation of said valves including a valve operating element having a release position, resilient means for normally maintaining said element in said release position, resilient means connecting said element and valves adapted to bias said valves toward closed position and adapted on movement of said element from release position to decrease the biasing action on said inlet valve and to increase the biasing action on said exhaust valve, means including a member responsive to the pressure in the inlet chamber for biasing said inlet valve toward open position with a force variable in accordance with variations of pressure in said inlet chamber, and means for effecting non-yielding connections between said valves and element for maintaining the inlet valve in closed position and the exhaust valve in open position when the element is in release position.

8. Self-lapping fluid pressure control valve mechanism including a casing having an inlet chamber, an outlet chamber, an inlet port connecting said chambers, an inlet valve associated with said inlet port adapted to be moved toward open position by the pressure in said inlet chamber, an exhaust port in said outlet chamber, an exhaust valve associated with said port and adapted to be moved toward open position by the pressure in said outlet chamber, a valve operating element having a release position, a spring for normally maintaining said element in release position, inlet and exhaust valve springs interposed between said element and valves adapted to bias the latter toward closed position and adapted on movement of said element from release position to respectively exert decreasing and increasing biasing forces on the corresponding valves on movement of said element from release position to permit movement of the inlet valve toward open position by the pressure in said inlet chamber and insure closing of the exhaust valve, and means for insuring opening of said inlet valve when the element has been moved a predetermined distance from release position regardless of the pressure in said inlet chamber including a pressure responsive member adapted on movement in one direction to engage and bias the inlet valve toward open position, means for subjecting said pressure responsive member to the pressure in the inlet chamber for opposing movement of the pressure responsive member in said one direction, and resilient means for biasing the pressure responsive member in said one direction.

9. Self-lapping fluid pressure control valve mechanism including a casing having an inlet chamber, an outlet chamber, an inlet port connecting the inlet and outlet chambers, and an exhaust port in the outlet chamber, an inlet valve associated with the inlet port and adapted to be urged toward open position by the pressure in the inlet chamber, an exhaust valve associated with the exhaust port and adapted to be urged toward open position by the pressure in the outlet chamber, a valve operating element having a release position, resilient means for normally maintaining said element in release position, resilient means connecting said element and valves operable on movement of the element from release position to permit opening of the inlet valve by the pressure in said inlet chamber and to effect closing of said exhaust valve, and means for effecting non-yielding connections between said valves and element when the latter is maintained in release position by the first named resilient means for positively maintaining the inlet and exhaust valves in respectively closed and open positions.

10. Self-lapping fluid pressure control valve mechanism including a casing having an inlet chamber, an outlet chamber, an inlet port connecting the inlet and outlet chambers, and an exhaust port in the outlet chamber, an inlet valve associated with the inlet port and adapted to be urged toward open position by the pressure in the inlet chamber, an exhaust valve associated with the exhaust port and adapted to be urged toward open position by the pressure in the outlet chamber, a valve operating element having a release position, resilient means for normally maintaining said element in release position, and means for controlling the operation of said valves including a resilient connection between said element and inlet valve adapted to bias said inlet valve toward closed position and adapted on movement of said element from release position to bias said inlet valve toward closed position with a force decreasing in proportion to the degree of movement of said element from release position, a resilient connection between said exhaust valve and element adapted to bias the exhaust valve toward closed position with a force increasing in proportion to the degree of movement of said element from release position, and means for biasing the inlet valve toward open position with a force varying in accordance with variations of pressure in said inlet chamber including a member having an area substantially equal to that of the inlet valve adapted on movement in one direction to engage the inlet valve and urge the latter toward open position, means for subjecting said member to the pressure in the inlet chamber whereby said member is urged in the opposite direction by the action of said pressure, and resilient means for biasing the member in said one direction.

11. Self-lapping fluid pressure control valve mechanism including a casing having an inlet chamber, an outlet chamber, an inlet port connecting the inlet and outlet chambers, and an exhaust port in the outlet chamber, an inlet valve associated with the inlet port and adapted to be urged toward open position by the pressure in the inlet chamber, an exhaust valve associated with the exhaust port and adapted to be urged toward open position by the pressure in the outlet chamber, a valve operating element having a release position, resilient means for normally maintaining said element in release position, and means for controlling the operation of said valves including a resilient connection between said element and inlet valve adapted to bias said inlet valve toward closed position and adapted on movement of said element from release position to bias said inlet valve toward closed position with a force decreasing in proportion to the degree of movement of said element from release position, a resilient connection between said exhaust valve and element adapted to bias the exhaust valve toward closed position with a force increasing in proportion to the degree of movement of said element from release position, and means for biasing the inlet valve toward open position with a force varying in accordance with variations of pressure in said inlet chamber including a member having an area substantially equal to that of the inlet valve adapted on movement in one direction to engage the inlet valve and urge the latter toward open position, means for subjecting said member to the pressure in the inlet chamber whereby said member is urged in the opposite direction by the action of said pressure, resilient means for biasing the member in said one direction, and means for adjusting the tension of said resilient means.

12. Self-lapping fluid pressure control valve mechanism including a casing having an inlet chamber, an outlet chamber, an inlet port connecting said chambers, and an exhaust port in said outlet chamber, an inlet valve associated with said inlet port and urged toward open position by the pressure in said inlet chamber, an exhaust valve associated with said exhaust port and urged toward open position by the pressure in said outlet chamber, a valve controlling element responsive to the pressure in said outlet chamber and having a release position, and means for operating said valves to establish and maintain a predetermined pressure in said outlet chamber substantially proportional to the degree of movement of said element from release position including a spring controlled by said element for permitting opening movement of said inlet valve on initial movement of the element from release position and operable to close said inlet valve when said predetermined pressure is established in said outlet chamber, and a second spring controlled by said element for maintaining said exhaust valve in closed position except when said predetermined pressure in said outlet chamber is exceeded at any given position of said element.

13. Self-lapping fluid pressure control valve mechanism including a casing having an inlet chamber, an outlet chamber, an inlet port connecting said chambers, and an exhaust port in said outlet chamber, an inlet valve associated with said inlet port and urged toward open position by the pressure in said inlet chamber, an exhaust valve associated with said exhaust port and urged toward open position by the pressure in said outlet chamber, a valve controlling element having a release position, and means for operating said valves to establish and maintain a predetermined pressure in said outlet chamber substantially proportional to the degree of movement of said element from release position including a spring controlled by said element for permitting opening movement of said inlet valve on initial movement of said element from release position and operable to close said inlet valve when said predetermined pressure is established in said outlet chamber, a second spring controlled by said element on movement of the latter from release position for maintaining said exhaust valve in closed position except when the pressure in said outlet chamber exceeds said predetermined pressure at any selected position of said element, and means for exerting a force on said inlet valve tending to open the latter and substantially equal to the decrease in force exerted by the pressure in the inlet chamber to open the valve when the pressure in the inlet chamber decreases including a pressure responsive member having an area substantially equal to that of the inlet valve, said member being subjected to the pressure in the inlet chamber for biasing the member in one direction, and a spring for urging the member in the opposite direction to engage said inlet valve and to bias the latter toward open position.

14. Self-lapping valve mechanism comprising a casing provided with inlet, outlet and exhaust openings for conducting fluid pressure to and from the casing, inlet and outlet valves for the inlet and outlet openings mounted for closing in a direction opposite to the flow of fluid pressure, a valve operating member slidably mounted in the casing, a valve operating beam within the casing having its central portion secured to said member and provided with oppositely extending arms arranged in a common plane, resilient means for normally maintaining the beam and member in release position, an inlet valve spring in the chamber interposed between the inlet valve and one of said arms for biasing the inlet valve to closed position, and an exhaust valve spring interposed between the exhaust valve and the other of said arms for biasing the exhaust valve toward closed position, movement of said member and beam from release position causing a gradual decrease in the biasing action of the inlet valve spring and a gradual corresponding increase in the biasing action of the exhaust valve spring.

15. Valve mechanism as defined in claim 14 which includes resilient means for biasing the inlet valve toward open position.

16. Valve mechanism as defined in claim 14 which comprises in addition, means including a member responsive to the pressure at the inlet opening for biasing the inlet valve toward open position with a force variable in accordance with variations of pressure at the inlet opening.

WILFRED A. EATON.

REFERENCES CITED

The following references are of record in the file of this patent:

UNITED STATES PATENTS

| Number | Name | Date |
| --- | --- | --- |
| 2,200,591 | Boldt | May 14, 1940 |